3,285,878
POLYMERIZATION OF FORMALDEHYDE
James C. MacKenzie, Rochester, N.Y., and Joel A. Yancey, Lexington, Mass., assignors to Cabot Corporation, Boston, Mass., a corporation of Delaware
No Drawing. Filed Oct. 23, 1965, Ser. No. 504,246
17 Claims. (Cl. 260—67)

This application is a continuation-in-part of Serial No. 241,500 filed December 3, 1962, now abandoned.

This invention relates to the polymerization of formaldehyde, paraformaldehyde, trioxane and mixtures thereof.

Accordingly, it is a principal object of the present invention to provide an improved process for polymerizing formaldehyde, paraformaldehyde, trioxane and mixtures thereof.

Other objects of the present invention will in part be obvious and will in part appear hereinafter.

In accordance with the present invention, formaldehyde, paraformaldehyde, trioxane, or mixtures thereof are polymerized by catalysts comprising the product of the reaction carried out under certain conditions between a halide-type compound of a metal of Group IVa, Va, or VIa and hydroxyl groups on the surface of a finely divided particulate inorganic solid. The polymerization reaction can be effected at suitable temperatures within the range of from about −80° C. to about 190° C., and pressures ranging from below atmospheric upwardly to any desired maximum pressure.

Inorganic solids suitable for the purposes of the present invention generally include any inorganic compound which is available in finely divided particulate form with hydroxyl groups on the surface thereof. For example, oxides such as alumina, zirconia and silica, carbon blacks such as channel black and furnace black, and aluminates such as corundum are all generally suitable for the purposes of the present invention. In particular, inorganic solids, and more particularly, pyrogenic oxides, such as alumina, silica, and titania having an average particle size below about 0.1 micron, and a chemically bound surface hydroxyl group concentration of at least about $1 \times 10^{-4}$ equivalents per gram are definitely preferred.

Halide-type compounds of Groups IVa, Va, or VIa (hereinafter generally referred to as transition metal halides) suitable for the purposes of the present invention are the compounds conforming to the empirical formula:

$$TO_aX_b$$

wherein T is a metal of Groups IVa, Va, or VIa (where the group numbers correspond to the Mendeleev Periodic System); O is oxygen; $a$ is a number from 0 to 2; each X is any halogen; and $b$ is a number from 1 to 6.

Examples of suitable compounds conforming to said empirical formula are halides such as zirconium tetrachloride, vanadium tetrachloride, and titanium tetraiodide, tantalum pentabromide, molybdenum pentachloride, and oxyhalides such as chromium oxychloride and vanadium oxychloride.

The conditions under which reaction between the transition metal halide and the finely divided inorganic solid can be accomplished are subject to considerable variation. However, in order to obtain a catalyst with high activity and reproducible character and performance, it has been found to be all important that the finely divided inorganic solid be essentially dry and anhydrous (i.e. free of molecular water in any form) at the time it is brought into contact with the transition metal halide. In addition, it is recommended that the reaction of the inorganic solid and the transition metal be accomplished so as to allow by-products of the reaction to be eliminated from the reaction zone in order to thereby insure that said reaction goes to completion. Generally, the said reaction can be carried out by contacting said inorganic solid with said transition metal halide, preferably in a solution thereof in an inert hydrocarbon medium, and maintaining the two reactants in intimate contact for a period of time sufficient to effect the desired chemical reaction resulting in the chemical bonding of the transition metal to the inorganic solid. The length of time required to effect a given amount of such reaction and chemical bonding is largely dependent upon the temperature of the reaction mixture. Generally speaking, almost any temperature between about 0° C. and 300° C. and even higher temperatures can be used satisfactorily, but room temperature to about 105° C. is generally preferred. Assuming provision is made for intimate contact of the dry inorganic solid and the transition metal halide, the *minimum* time required to accomplish the chemical reaction will vary from about 10 hours at 0° C. to about 15 minutes at a temperature of 300° C. Temperatures substantially higher than about 300° C., e.g. 500° C. are completely needless and therefore of little or no interest.

Elimination of by-products of the reaction from the reaction zone, i.e. from the reaction medium, can be accomplished in any convenient manner such as, by sweeping the reaction vessel with an inert gas, by carrying out the reaction at sufficiently elevated temperatures while stirring to drive by-products out of the reaction medium, or by complexing or reacting said by-products with suitable substances such as tertiary amines, tertiary arsines, tertiary phosphines, terpenes, terpinenes, tetrasubstituted hydrazines, carbides such as calcium carbide, and other substances which will react or complex with said by-products and thereby eliminate them.

Polymerizable compounds suitable for the purposes of the present invention are formaldehyde, paraformaldehyde and trioxane. It should be noted that the compounds paraformaldehyde and trioxane are low polymers of formaldehyde, trioxane being a cyclic trimer and paraformaldehyde a low linear polymer of 2 to about 100 monomeric units. Generally, the first step in the polymerization of these materials is a depolymerization procedure, the actual polymerization reaction being of the pure monomer, formaldehyde. However, since the depolymerization of trioxane and paraformaldehyde can easily be effected within the same reaction vessel as the polymerization and the reactions can even run concurrently, it is intended that the present disclosure apply to all three of said compounds.

Using the catalysts of this invention, polymerization of formaldehyde, paraformaldehyde and trioxane can be accomplished in the absence of liquids (other than the monomers themselves) solvents or diluents, for example, in the gas phase, but it is usually more convenient to effect polymerization in the presence of a substantially inert liquid reaction medium. Accordingly, an inert liquid reaction medium is preferably supplied to the reaction zone.

Several classes of hydrocarbons or their mixtures which are liquid and substantially inert under the polymerization reaction media. Thus, various classes of saturated hydrocarbons such as pure alkanes or cycloalkanes or commercially available mixtures, freed of harmful impurities, are suitable for the purposes of the present invention. For example, alkanes and cycloalkanes, and liquid or liquefied alkanes such as n-hexane, 2,3-dimethylbutane, n-dodecane, dimethylcyclopentane, methyldecalins, and the like are suitable.

The quantity of catalyst, i.e., the quantity of surface reacted, finely divided solid to be utilized in the polymerization reaction may vary, but in general, the total quantity of catalyst that need be employed based on the weight of the charging stock is small, particularly when a very fine particle size oxide is utilized as the inorganic solid.

The contact time or space velocity employed in the polymerization process will be selected with reference to the other process variables such as the particular catalysts utilized, the specific type of product desired, and the extent of monomer conversion desired in any given run or pass over the catalyst. In general, this variable is readily adjustable to obtain the desired results.

There follow a number of illustrative non-limiting examples:

Example 1

To a 1000 milliliter three neck, glass reaction vessel, there is added 20 grams of "Cab-O-Sil," a pyrogenic silica produced by Cabot Corporation, which has an average particle diameter of 10 millimicrons and a hydroxyl group content on the surface thereof of about 1.5 milliequivalents per gram. Said reaction vessel is then placed in a vacuum drying oven heated to a temperature of about 100° C. for about twelve hours. Subsequently, the vessel is sealed without exposing the silica to the atmosphere and there is charged to said vessel 20 millimoles of titanium tetrachloride and 500 milliliters of toluene. The vessel is then continuously stirred and maintained at refluxing temperature for a period of 8 hours while the contents thereof are swept by a stream of dry nitrogen. Subsequently, the extent of the reaction between the titanium tetrachloride and the silica is determined by measuring the quantity of HCl removed from the vessel by the nitrogen stream, and by testing the liquid contents of the vessel for the absence therein of titanium tetrachloride and the said silica is found to have 20 milliatoms of titanium chemically bound to the surface thereof. 50 milliliters of this slurry containing about 2 milliatoms of titanium bound to the surface of about 2 grams of silica, is then transferred from this reaction vessel to a 500 milliliter three neck reaction vessel equipped with a stirrer and previously flushed with dry nitrogen. There is then added to said slurry 200 milliliters of anhydrous toluene. Subsequently, formaldehyde monomer which has been produced by the pyrolysis of paraformaldehyde is bubbled through the resulting slurry for about 4 hours at ambient temperature. The reaction products are analyzed and it is found that about 20 grams of solid polyformaldehyde polymer having an inheernt viscosity of about 0.39 in dimethylformamide at 130° C. has been formed (paraformaldehyde has an inherent viscosity of 0.05).

Example 2

This example is a duplicate of Example 1 except that no reaction between the silica and the titanium tetrachloride is attempted. Instead, the silica, toluene and titanium tetrachloride slurry is maintained at room temperature for about 10 minutes, after which, 50 milliliters of said slurry is transferred to the 500 milliliter reaction vessel. Next, the formaldehyde monomer is introduced into the slurry in said 500 milliliter reaction vessel. After 4 hours, it is found that only 5 grams of solid polymer has been formed.

Example 3

This example is a duplicate of Example 1 with the exception that the silica is not dried prior to reaction with the titanium tetrachloride. Upon completion of the polymerization phase of this experiment, it is found that only 0.1 gram of solid polyformaldehyde has been formed.

Example 4

To a 2,000 millimeter, three neck, glass reaction vessel equipped with a stirrer, a condenser and nitrogen inlet and outlet tubes, there is added 1700 milliliters of benzene and 21.2 grams of "Alon," a pyrogenic alumina produced by Deutsche Gold und Silber Scheideanstalt vormals Roessler, and which has an average particle diameter of about 10–40 millimicrons and a hydroxyl group content on the surface thereof of about 0.7 milliequivalents per gram. The resulting slurry is then dried by being heated to, and maintained at, the boiling point of benzene, i.e., about 80° C., for about 20 hours while a water/benzene azeotrope is removed from the reaction vessel by periodic distillation until about 450 milliliters of distillate has been removed. The vessel is then cooled and charged with 14 millimoles of vanadium oxytrichloride. The vessel is then continuously stirred, and maintained at refluxing temperatures for a period of about 10 hours while the contents are swept with a stream of dry nitrogen. Subsequently, the extent of the reaction between the vanadium oxytrichloride and the alumina is determined by measuring the quantity of HCl removed from the vessel by the nitrogen stream, and by testing the liquid contents of the vessel for the absence therein of vanadium oxytrichloride, and the said alumina is found to have 14 milliatoms of vanadium chemically combined to the surface thereof. Next, about 178 millilters of the resultant slurry, containing about 2 milliatoms of vanadium bound to the surface of about 2.9 grams of alumina, is transferred from this reaction vessel to a 500 milliliter stirred reaction vessel which has been previously flushed with dry nitrogen and to which there has been charged 24 grams of trioxane. Said vessel is then stirred continuously and heated to, and maintained at, about 70° C. for 48 hours. The reaction products are analyzed and it is found that a solid polyformaldehyde polymer having an inherent viscosity of about 0.17 in dimethylformamide at 130° C. has been produced.

The polymers by the process of this invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as carbon black and silicas, extenders, plasticizers, pigments, insecticides, fungicides, etc., can be incorporated into the polymers.

Obviously many changes may be made in the above described examples and procedure without departing from the scope of the invention. For example, although only transition metal chlorides are mentioned in the above examples, transition metal bromides, iodides and fluorides are also suitable for the purposes of the present invention. For example, titanium tetrafluoride is entirely suitable.

Also, coprecipitated metal oxides, or metal oxides conformed with, or mixed with other compounds are suitable finely divided inorganic solids for the purposes of the present invention.

Accordingly, it is intended that the above disclosure be regarded as illustrative and as in no way limiting the scope of the invention.

What we claim is:

1. A process for polymerizing formaldehyde, paraformaldehyde, trioxane, or mixtures thereof which comprises contacting said substance at temperatures between about −80° C. and about 190° C. with a catalyst comprising a finely-divided inorganic solid having an average particle diameter of less than about 0.1 micron and carrying in chemical combination on the surface thereof at least about $1 \times 10^{-4}$ equivalents per gram of structures conforming to the formula $$TO_aX_b$$

wherein T is a metal of Groups IVa, Va, and VIa; O is oxygen; $a$ is a number from 0 to 2; each X is any halogen; $b$ is a number from 1 to 5 and where said structures are chemically linked directly from T to at least one oxygen atom in the surface of said solid.

2. The process of claim 1 wherein T in the formula $$TO_aX_b$$

is a metal of Group IVa.

3. The process of claim 1 wherein T in the formula $$TO_aX_b$$

is titanium.

4. The process of claim 1 wherein T in the formula $$TO_aX_b$$

is zirconium.

5. The process of claim 1 wherein T in the formula $$TO_aX_b$$

is a metal of Group Va.

6. The process of claim 1 wherein T in the formula $$TO_aX_b$$

is vanadium.

7. The process of claim 1 wherein T in the formula $$TO_aX_b$$

is a metal of Group VIa.

8. The process of claim 1 wherein each X in the formula $$TO_aX_b$$

is chlorine, bromine or iodine.

9. The process of claim 1 wherein each X in the formula $$TO_aX_b$$

is chlorine.

10. The process of claim 1 wherein in the formula $$TO_aX_b$$

$a$ is zero and each X is chlorine.

11. The process of claim 1 wherein in the formula $$TO_aX_b$$

T is titanium, $a$ is 0, each X is chlorine and $b$ is 3.

12. The process of claim 1 wherein in the formula $$TO_aX_b$$

T is vanadium, $a$ is 1 and each X is chlorine.

13. The process of claim 1 wherein formaldehyde is polymerized.

14. The process of claim 1 wherein paraformaldehyde is polymerized.

15. The process of claim 1 wherein trioxane is polymerized.

16. A process for polymerizing formaldehyde, paraformaldehyde, trioxane or mixtures thereof, which comprises contacting said substance at temperatures between about —80° C. and about 190° C., with a catalyst comprising the product of the reaction, accomplished at temperatures between about 0° C. and about 300° C., for a period ranging at a minimum from about 10 hours to about 15 minutes, the higher the temperature used, the shorter being the minimum time required, of (a) a compound conforming to the formula $$TO_aX_b$$

where T is a metal of Groups IVa, Va, and VIa; O is oxygen; $a$ is a number from 0 to 2; each X is any halogen; and $b$ is a number from 1 to 6; and (b) hydroxyl groups in the surface of a finely divided inorganic solid having an average particle diameter of less than about 0.1 micron and having at least about $1 \times 10^{-4}$ equivalents per gram of hydroxyl groups on the surface thereof.

17. The process of claim 16 wherein the reaction between the compound conforming to the formula $$TO_aX_b$$

and the hydroxyl groups is accomplished at temperatures between about 25° C. and about 105° C.

References Cited by the Examiner

UNITED STATES PATENTS

| | | | |
|---|---|---|---|
| 2,795,571 | 6/1957 | Schneider | 260—67 |
| 3,005,799 | 10/1961 | Wagner | 260—67 |
| 3,030,338 | 4/1962 | Aries | 260—67 |
| 3,166,544 | 1/1965 | Orzechowski et al. | 260—93.7 |

SAMUEL H. BLECH, *Primary Examiner.*

WILLIAM H. SHORT, *Examiner.*

L. M. MILLER, *Assistant Examiner.*